United States Patent [19]

Vitale et al.

[11] Patent Number: 4,584,226

[45] Date of Patent: Apr. 22, 1986

[54] LOAD TRANSFER STRUCTURE AND METHOD OF MAKING THE SAME

[75] Inventors: Mario L. Vitale, St. Louis County; Victor A. Finazzo, St. Peters, both of Mo.

[73] Assignee: McDonnell Douglas Corporation, St. Louis, Mo.

[21] Appl. No.: 605,139

[22] Filed: Apr. 30, 1984

[51] Int. Cl.$^4$ ............................................... B32B 5/12
[52] U.S. Cl. ..................................... 428/105; 156/172; 156/213; 428/110; 428/113; 428/408; 428/902
[58] Field of Search ............... 428/105, 107, 109, 110, 428/408, 902, 113; 156/172, 212, 213, 227

[56] References Cited

U.S. PATENT DOCUMENTS

| | | | |
|---|---|---|---|
| 3,632,460 | 1/1968 | Palfreyman | 156/175 |
| 4,168,337 | 9/1979 | Maistre | 428/113 |
| 4,201,815 | 5/1980 | Weiland et al. | 428/113 |
| 4,390,583 | 6/1983 | Brazel | 428/113 |

*Primary Examiner*—James J. Bell
*Attorney, Agent, or Firm*—Gravely, Lieder & Woodruff

[57] ABSTRACT

A load transfer structure in which laminated sheets and fiber strands are formed into webs directed to intersect at a common junction and integrated by resin using heat and pressure. The fiber strands are inserted between the laminated sheets by a method of continuously winding such a strand in a repetitive weave pattern around primary spaced supports or mandrels carrying the laminate sheets, and then combining with the wound laminate sheets other laminate sheets supported on secondary mandrels. The mandrels with the sheets and wound fiber strand are cured in a heating and pressure step so that the load transfer structure has its several components integrated into rigid and hard webs directed outwardly from the common zone where the fiber strands cross each other without interruptions.

12 Claims, 7 Drawing Figures

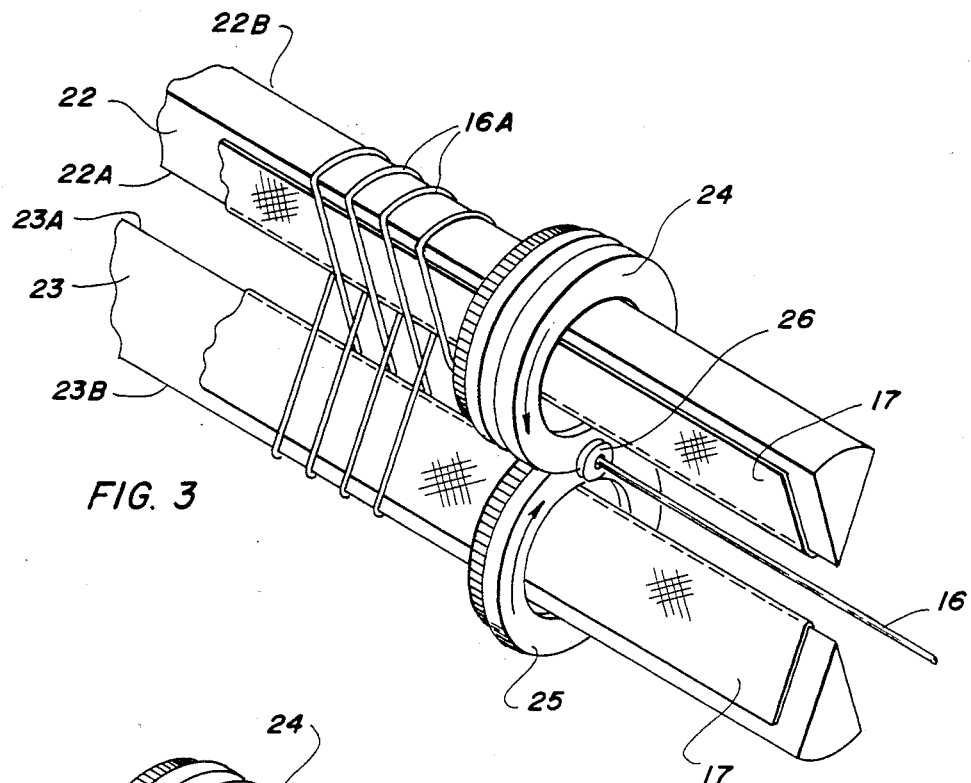
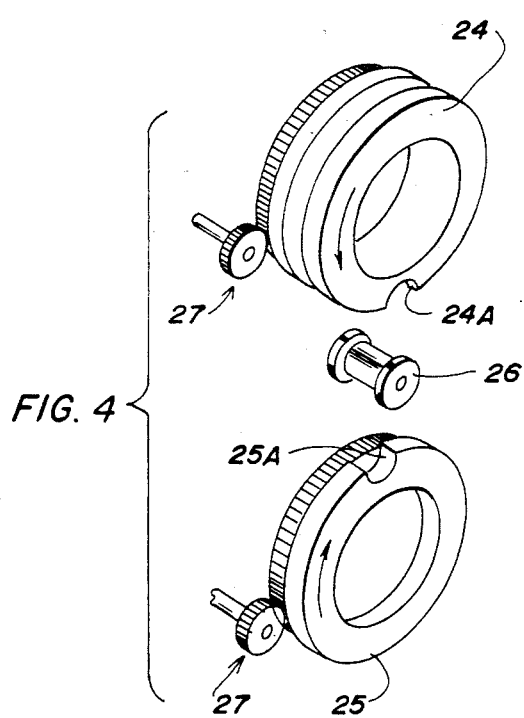
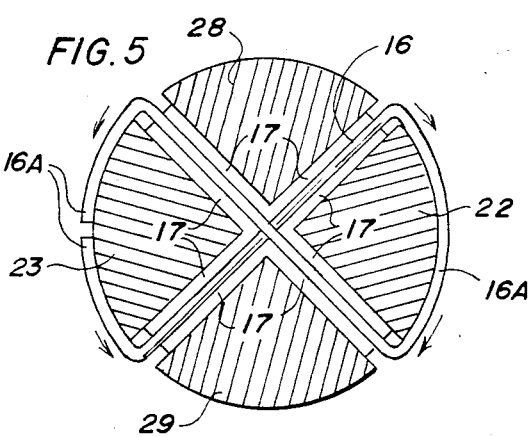
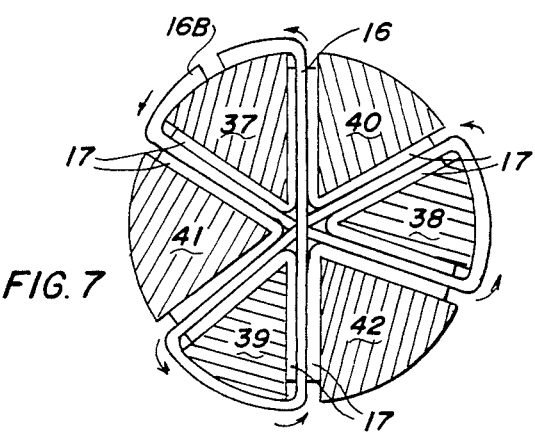

LOAD TRANSFER STRUCTURE AND METHOD OF MAKING THE SAME

BACKGROUND OF THE INVENTION

The Government has rights in this invention pursuant to Contract No. N62269-81-C-0386 awarded by Department of the Navy.

1. Field of the Invention

This invention is related to a load transfer structure incorporating a continuous fiber strand having continuity in the crossing intersection, and to the method of making a load transfer structure with a continuous fiber strand introduced therein by rotary weaving.

2. Description of the Prior Art

The prior art is best illustrated in the Weiland et al U.S. Pat. 4,201,815 of May 6, 1980 where a shear transfer element fiber strands forming webs cross each other at an intersecting junction line with the individual fibers extending continuously through the web on both sides of the intersecting line. In the method of making the element a pair of independent winding mandrels, each having a separate fiber supply operates intermittently during the winding cycle.

Other less pertinent examples of the prior art are Palfreyman et al U.S. Pat. No. 3,632,460 of Jan. 4, 1968 which pertains to weaving a compressor disc of high-strength fiber material, Maistre U.S. Pat. No. 4,168,337 of Sept. 18, 1979 which pertains to a reinforced three dimensional structure of bundles constituted by sheets of rectilinear elements which intersect at predetermined angles, and Brazel U.S. Pat. No. 4,390,583 of June 28, 1983 relating to multi-filament fibers of alumina forming a multi-directional preform with fibers oriented in at least three directions.

The prior art has presented problems in producing an efficient and inexpensive load transfer structure. For example in U.S. Pat. No. 4,201,815 the fibers pass through the line of intersection at different angles because of the special weaving technique employed. Also in this patent the recommended arrangement is that each planar web forming the element consist of a plurality of integrally connected fiber layers with the fibers in each layer being unidirectional and with the fibers in certain adjacent layers extending in different directions. In the U.S. Pat. No. 3,632,460 the weaving technique involves a construction of fibers forming an integral blade and disc using special mechanisms to move radially from the disc circumference outwards to form blade flanks. While the U.S. Pat. No. 4,168,337 forms bundles of fiber elements, the final structure has the bundles arranged so the fiber elements of each bundle are directed diagonally to the elements of at least two of the other bundles in a four-directional reinforcement structure. The U.S. Pat. No. 390,583 is somewhat like U.S. Pat. No. 4,168,337 but is directed to fiber elements arranged in a three-axis preform.

SUMMARY OF THE INVENTION

The present invention has as an important object the making of a load transfer structure, which may have a cruciform shape, by utilizing continuous fibers directed through the intersection of pairs of webs so as to provide continuity in the structural connection between opposing webs and an efficient means of transferring loads. The present invention has as another object a method of utilizing a strand of one or more fibers manipulated in an interweaving tool which directs the strand in a repetitive path, which may have a clover leaf or figure eight pattern to obtain either a modified or a cruciform load transfer structure.

The cruciform load transfer structure is made by tooling having a primary set of mandrels associated with shuttle carrier rings which direct a single fiber strand or roving through a weave crossing intersection and alternately about the primary mandrels which form the pattern for the continuous weaving, as in a clover leaf or a figure eight configuration. The tooling includes shuttle carrier rings that, in a preferred embodiment, are mounted to rotate in a fixed orbit while the mandrels are shifted relative to the rings to form a cruciform load transfer structure of any derired length.

The preferred embodiment of the present invention uses resin impregnated components which will be amenable to ease of establishing the weave and layup of the components and subsequent heat and pressure curing of the cruciform member.

BRIEF DESCRIPTION OF THE DRAWINGS

The present embodiment of tooling for making the cruciform member of this invention is illustrated in the following drawings, wherein:

FIG. 3 is a perspective view of the weaving tooling for fabricating the cruciform structure;

FIG. 4 is an exploded perspective view of the rotary weaving mechanism used in the tooling of FIG. 3;

FIG. 5 is a schematic end view of a set of mandrels which are utilized to consolidate the components which when cured make up one form of cruciform shaped load transfer structure;

FIG. 7 is a schematic end view of a mandrel set utilized for making the modified form of load transfer structure seen in FIG. 6.

DESCRIPTION OF THE EMBODIMENT

Figure 1:
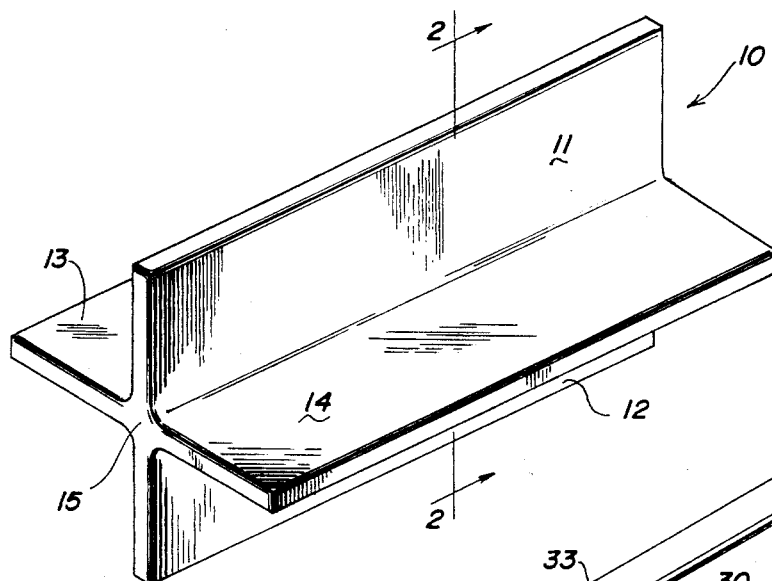
FIG. 1 is a perspective view of a finished cruciform shaped load transfer structure embodying the predetermined arrangement of components which lend themselves to a simple method for fabricating the structure.

The cruciform shaped load transfer structure 10 of this invention is shown in FIG. 1 to be an elongated body having webs 11 and 12 in one substantially aligned vertical plane, and webs 13 and 14 in one substantially aligned horizontal plane. While this view shows the respective vertical and horizontal pairs of webs positioned at right angles, it is intended to show this special relationship without limitation as to forming the structure 10 with its webs at other than in a right angular relationship. The desired angular relationship depends upon the use to which the structure 10 is put, as the webs 11 and 12 have a load carrying capacity in the common plane, and webs 13 and 14 have a load carrying capacity in their common plane. By uniting the components in the form of the structure seen in FIG. 1, loads in either plane of the paired webs 11, 12 and 13, 14 are passed through the intersection zone 15 without imposing forces that would tend to separate, or to delaminate whatever the makeup of the webs.

Figure 2:
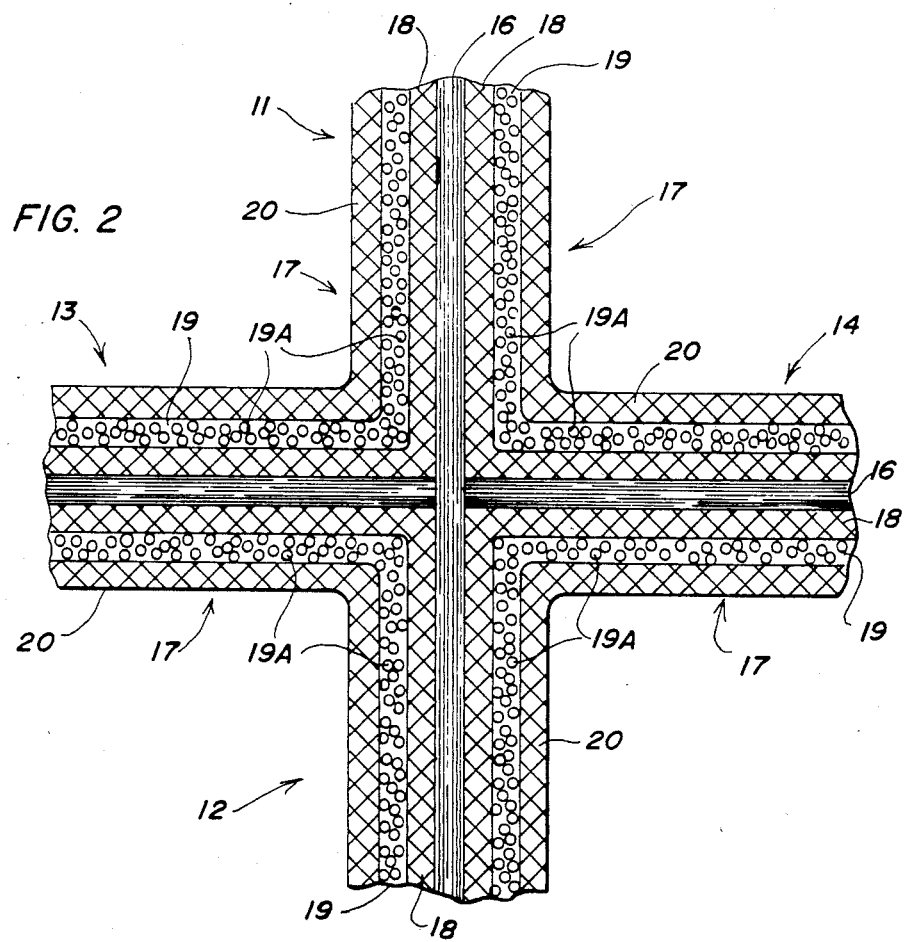
FIG. 2 is a greatly enlarged sectional view of the load transfer structure for showing the arrangement of components, the view being taken along line 2—2 in FIG. 1.

Turning now to FIG. 2 there is shown in an enlarged sectional view the components making up the respective webs in the structure 10 seen in FIG. 1. The webs are composed of a core which is a carbon fiber resin treated strand or roving 16, and since this strand is a continuous one, as will appear from FIG. 3, it is present in each web. It is well known in the art that carbon exists in many inorganic and in all organic compounds, such as in amorphous, graphitic and diamond allotropes, and that by reference to carbon strands it is meant to be directed to the pratical graphite type strands. The strand lies under or is enclosed by laminated sheets 17 placed in each of the four quadrants of the cruciform shaped structure so as to be initially supported on or by mandrels used in the winding method. Each laminated sheet 17 includes a first resin treated carbon fiber cloth 18 positioned next to the carbon fiber strand 16, a carbon fiber containing tape 19, and a second resin treated carbon fiber cloth 20. Each component is impregnated with a resin before being incorporated in the assembly seen in FIG. 2. The resin is not fully cured so the components retain a tacky characteristic which aids in retaining the components in desired positions.

Special attention is paid to the way each component is intended to contribute to the load carrying ability of the finished structure 10. For example the cloth 18 next to the core fibers 16 is woven with warp and woof fibers normally at right angles, but when incorporated in the structure of FIG. 2 the cloth is cut into sheets with the weave at about 45°, which is known as cut on the bias. This places the weave of the cloth 18 at 45° to the longitudinal line of the intersection zone 15. The next outward component 19 is a fiber tape in which the resin treated fibers 19A are directed to run parallel with the intersection zone 15 of the structure 10. The outermost component 20 is another carbon fiber cloth which is cut on the bias so its fibers are directed at about 45° to the longitudinal line of the intersection zone 15. The object being, in this case, to have the two carbon fiber cloths complement each other to carry loads that are angularly directed or eccentric to the normal longitudinal and transverse axes of the structure 10. The eccentricity being exhibited by the way the cloth 18 and 20 is cut so its weave is directed at from about 30° to about 45° to the axis of the intersection zone 15.

Once the components shown in FIG. 2 have been positioned in the disclosed relationship, the entire load transfer structure with its mandrel tooling still in place, as will be described presently, is enclosed by winding a suitable type tape about it to contain the various parts in assembly during the heat and pressure curing stage. The curing stage is performed in a heating chamber or autoclave at elevated temperature and pressure.

Turning now to FIGS. 3 and 4, there is shown in a diagrammatic way one winding tooling arrangement by which the structure 10 can be created. A pair of wedge shaped mandrels 22 and 23 are placed in parallel adjacency with the inner edges 22A and 23A adjacent and the outer rounded surfaces 22B and 23B outermost. These mandrels 22 and 23 are lined up to enter winding rings 24 and 25 so as to be in a position to receive the continuous length of carbon fiber strand 16 which is fed from a suitable source (not shown) into a spool type shuttle 26 which cooperates with each of the winding rings 24 and 25. In FIG. 4 the winding rings 24 and 25 are shown in exploded view relative to the shuttle spool 26 so as to reveal that each of the rings is formed with a recess 24A and 25A respectively. The spool 26 is sized to fit into these recesses when the rings are rotated to positions to align the recesses. As the spool 26 passes into the position of alignment of the recesses in the specific rings, a mechanism not shown, but of known character, passes the spool from the ring that brought it into the alignment position of the recesses to the opposite ring thereby causing the spool to travel in a path that is shown for present purposes to form a figure eight. Each ring has drive and driven gears 27 to provide a positive drive for each of the rings. It can be seen in FIG. 3 that the strand 16 is passed over the upper mandrel 22 and then around that mandrel before being brought forward to pass around the lower mandrel 23 before being directed to pass through the intersection between the two mandrels as defined by the mandrel edges 22A and 23A. However, before the winding is initiated, each of the mandrels is provided with the laminated sheets 17 of cloth and tape, all as described in connection with FIG. 2.

The schematic view of FIG. 3 indicates by arrows that the mandrels 22 and 23 are intended to move in a longitudinal direction from right to left relative to the position of the rotary winding rings 24 and 25. As the rotation of the rings proceeds by means of the drive shown in 27, the mandrels must move in a longitudinal direction so that the strand 16 can be wound successively onto both of the mandrels. By adjusting the speed of rotation of the rings 24 and 25 and the longitudinal speed of the mandrels 22 and 23 it can be appreciated that the strand 16 can be wound with its turns closely adjacent. The spacing, as seen in FIG. 3, is only for purposes of showing the continuous winding of the strand 16 onto the mandrels.

Once the winding procedure of FIG. 3 has been completed, the mandrels 22 and 23 are removed from the winding rings and secondary mandrels 28 and 29 of FIG. 5 are positioned between the mandrels 22 and 23 so as to consolidate mandrels 22 and 23 and the wound components for the purpose of receiving a suitable type tape (not shown) that is applied before the consolidated mandrel tooling and the winding thereon is placed in a heating chamber or autoclave for curing purposes. It has been noted above that the components before being placed in assembly as shown in FIG. 2, are impregnated with a suitable resin that has not been completely cured but retains a tacky condition so as to facilitate the initiating position of these components on the mandrels as shown in FIG. 3 in the form of laminated sheets 17. Upon being cured, the structure 10 takes on a rigid characteristic and possesses a hard surface in which the fiber strands 16 are perpendicular to the zone 15 in each web 11–14, the fiber strands 19A in the tapes are parallel to the longitudinal zone 15, and the warp and woof weave of the carbon fiber cloths 18 and 20 resists loads at some angle to the other components. The structure 10 can be installed in a desired environment to carry loads directly through the intersection zone 15 by the fiber strand 16 so that there is no tendency for loads passed through the common junction between any two webs to peel the components in other webs.

After the heat curing has been completed, the positions 16A of the strands 16 are cut off so the mandrels 22 and 23 can be removed. The desired structure is released and appears as in FIG. 1. When tensile loads are applied to the structure 10 in directions substantially parallel to the intersection zone 15, those loads are transferred in tension through the tape principally by the alignment of the fibers 19A in the carbon fiber tape 19. Loads to be transferred through the structure 10 that are not applied either directly traverse to or longitudinally of the intersection zone 15 are transferred in tension by the warp and woof weave of the fibers in the carbon fiber cloth components 18.

The method of producing the load transfer structure involves feeding the fiber strand or roving from a source of desired capacity to a rotary weaving assembly having cooperating rings placed in meshing positions and a shuttle spool passed alternately between the rings at the meshing zone so the fiber strand can be carried around a pair of cooperating mandrels in alternate passes of the shuttle to weave the strand in a figure eight pattern over the mandrels. The method includes laying up in a laminated sheet form 17 a woven cloth with its warp and woof cut on the bias and enclosing a tape having longitudinal fiber strands by a woven cloth on each side of the tape. The components pointed out are impregnated with a suitable resin that is partly cured so they have tacky surfaces which aids in the placement of the sheets on the mandrels. The weaving step of the fiber strand about the mandrels and over the laminated sheets results in joining these components in cooperation for the subsequent curing step under heat and pressure. Before the curing step is performed, other laminate sheets 17 are brought into place as seen in FIG. 5 and then the secondary mandrel supports 28 and 29 are placed against the sheets 17. At this stage the assembly is cured at elevated temperature and pressure. In its final cured form, the load transfer cruciform structure has the ability to sustain tensile loads directed perpendicularly and parallel to the junction zone as well as loads that are neither parallel nor perpendicular to the junction zone.

Figure 6:
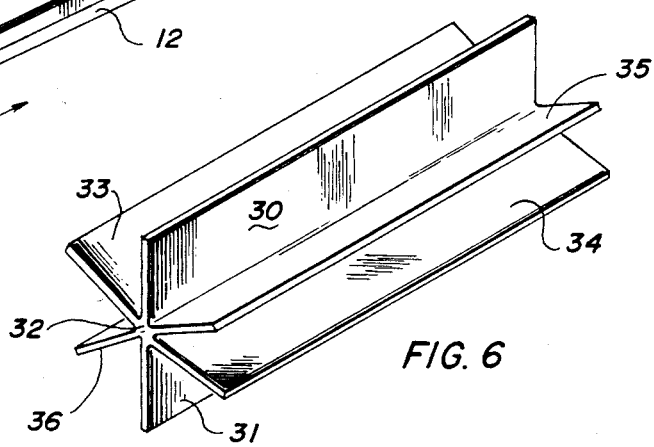
FIG. 6 is a modified cruciform load transfer structure made in accordance with the mandrel set arrangement in FIG. 7.

In FIGS. 6 and 7 there is shown a modified cruciform load transfer structure, and the arrangement of mandrels by which it can be performed. As seen in FIG. 6, a pair of webs 30 and 31 intersect at 32 where a second pair of webs 33 and 34 intersect with still another pair of webs 35 and 36. The structure of the webs seen in FIG. 6 can be formed by winding the resin treated fiber strand 16 about three primary mandrels 37, 38 and 39 in which the winding proceeds from a start at mandrel 37 and passes around mandrel 38, then around mandrel 39 and back around mandrel 37 in a clover leaf shaped pattern. This weaving continues for the desired length of the mandrel set. When a length has been wound, secondary mandrels 40, 41 and 42, with cooperating sheets 17, are positioned in the spaces between mandrels 37, 38 and 39 to consolidate the sheets 17 and the crossing runs of the fiber strand 16 into an assembly which is then bound together, as noted for the assembly of FIG. 5, and placed in an autoclave and cured at elevated temperature and pressure. After being cured the outer exposed reaches of the strands 16 are cut off and the mandrels removed. The steps of the winding and use of mandrels follows the teaching for the regular cruciform structure of FIGS. 2 and 5.

The foregoing disclosure has set forth certain examples of preferred embodiments of the invention by which we are able to produce a load transfer structure by a unique method that integrates components to orient fiber strands to accommodate the imposition of tensile loads from different directions. The present invention may be embodied in ways that differ from this disclosure without departing from the present teaching.

What is claimed is:

1. A method of producing a load transfer structure of cruciform configuration having planar webs intersecting at a common zone, the method comprising:
    (a) forming a first plurality of sheets of laminated cloth and tape formed of carbon fiber strands into cruciform related webs in which the webs have a common junction from which they extend in predetermined cruciform directions;
    (b) supporting the cruciform first plurality of laminated sheets so the webs at the common junction are in spaced positions;
    (c) winding a carbon fiber strand alternately around the first plurality of supported laminated sheets so the winding strands cross each other in the space between the webs of the first laminated sheets;
    (d) supporting other laminated sheets over the first laminated sheets for encasing the carbon fiber strands lying over the webs of the first laminated sheets; and
    (e) integrating the first and other laminated sheets with the carbon fiber strand therebetween such that the first and other laminated sheets and carbon fiber strands assume a substantially rigid load transfer structure of cruciform configuration.

2. The method of claim 1 wherein the first and other laminated sheets and fiber strands are impregnated with a resin material, and the integrating step is performed by application of heat and pressure.

3. The method of claim 1 wherein the first and other laminated sheets angularly oriented relative to the tape.

4. The method of claim 1 wherein the tape is angularly oriented relative to the fiber strand.

5. A method of producing a load transfer structure of cruciform configuration having planar webs in intersecting planes along a common junction comprising:
    (a) forming first sheets laminated from resin impregnated cloth and tape with carbon fibers directed in predetermined angular relationships in the cloth and tape into cruciform related webs extending outwardly from a common junction;
    (b) supporting first laminated sheets in adjacent positions with respect to the common junction with spaces therebetween;
    (c) winding a continuous length of a resin impregnated carbon fiber strand over and between the first supported laminated sheets such that the carbon fiber strand crosses in the space at the common junction between the supported laminated sheets, the winding proceeding alternately from one to the other of the supported laminated sheets;
    (d) placing other laminated sheets adjacent the first supported laminated sheets wound with the carbon fiber strand; and
    (e) curing the resin impregnated sheets of cloth, tape and the carbon fiber strand to integrate the same into a substantially unitary structure in which the laminated sheets and carbon fiber strand are formed into webs lying in intersecting planes to assume the cruciform configuration.

6. The method set forth in claim 5 and including applying pressure upon the laminated sheets during the curing step.

7. The method set forth in claim 5 and upon completion of the curing step removing the portions of the fiber strands that are free of contact with the laminated sheets.

8. A cruciform configured load transfer structure comprising:

(a) a plurality of first and second laminate components formed into webs angularly divergent from a common junction;
(b) carbon fiber strands extending between said webs and intersecting in a common junction where said carbon fiber strands cross over each other; and
(c) resin means impregnated in said laminate components and carbon fiber strands for integrating said components and carbon fiber strands into the cruciform configured load transfer structure in which tensile loads on said webs are transferred by said carbon fiber strands through said common junction.

9. The load transfer structure set forth in claim 8 wherein the fiber strands in said webs extend through said common junction in substantially parallel direction within each of said webs.

10. The load transfer structure set forth in claim 8 wherein said plurality of webs are arranged in pairs and said fiber strands extending through said common junction from a first pair of webs are continuous and intersect with fiber strands extending through said common junction from other pairs of webs.

11. The load transfer structure set forth in claim 8 wherein said resin means is curable for integrating said fiber strands and laminated components into a substantially rigid structure for transferring loads in tension in said fiber strands through said common junctions.

12. The load transfer structure set forth in claim 11 wherein said curable resin integrates said fiber strands and laminated components in each web against peeling reaction in webs adjacent any two webs under tension loads passed through said common junction.

* * * * *

UNITED STATES PATENT AND TRADEMARK OFFICE
CERTIFICATE OF CORRECTION

PATENT NO. : 4,584,226
DATED : April 22, 1986
INVENTOR(S) : Mario L. Vitale and Victor A. Finazzo It is certified that error appears in the above-identified patent and that said Letters Patent are hereby corrected as shown below:

Column 1, line 55, "U. S. Pat. No. 390,583" should be "U. S. Pat. No. 4,390,583".

Column 2, line 14, "derired" should be "desired"

Signed and Sealed this

Fifteenth Day of July 1986

[SEAL]

Attest:

Attesting Officer

DONALD J. QUIGG

Commissioner of Patents and Trademarks